US012675571B2

(12) United States Patent
Swami et al.

(10) Patent No.: US 12,675,571 B2
(45) Date of Patent: Jul. 7, 2026

(54) GUARD ROWS TO PROTECT REGIONS OF MEMORY

(71) Applicants: Advanced Micro Devices, Inc, Santa Clara, CA (US); ATI Technologies ULC, Markham (CA)

(72) Inventors: Shivam Swami, Ottawa (CA); SeyedMohammad SeyedzadehDelcheh, Sammamish, WA (US)

(73) Assignees: Advanced Micro Devices, Inc, Santa Clara, CA (US); ATI Technologies ULC, Markham (CA)

( * ) Notice: Subject to any disclaimer, the term of this patent is extended or adjusted under 35 U.S.C. 154(b) by 142 days.

(21) Appl. No.: 18/618,861

(22) Filed: Mar. 27, 2024

(65) Prior Publication Data

US 2025/0307399 A1     Oct. 2, 2025

(51) Int. Cl.
*G06F 21/56*          (2013.01)
(52) U.S. Cl.
CPC ...... *G06F 21/566* (2013.01); *G06F 2221/034* (2013.01)
(58) Field of Classification Search
CPC ............................... G06F 21/566; G06F 21/56
USPC ......................................................... 365/222
See application file for complete search history.

(56) References Cited

U.S. PATENT DOCUMENTS 5,185,771 A * 2/1993 Anger .................. H04N 25/622
                                                       348/E3.018
2023/0410882 A1* 12/2023 Verma ..................... G06F 21/52

OTHER PUBLICATIONS

Kim, Yoongu , et al., "Flipping bits in memory without accessing them: an experimental study of DRAM disturbance errors", ACM SIGARCH Computer Architecture News, vol. 42, No. 3 [retrieved Sep. 15, 2022]. Retrieved from the Internet ., Jun. 14, 2014, 12 Pages.*
Park, Yeonhong, et al., "Graphene: Strong yet Lightweight Row Hammer Protection", 2020 53rd Annual IEEE/ACM International Symposium on Microarchitecture (MICRO) [retrieved Dec. 14, 2023]. Retrieved from the Internet, Oct. 2020, 13 pages.*
Qureshi, Moinuddin , Rethinking ECC in the Era of Row-Hammer, DRAMSec [retrieved Nov. 30, 2023]. Retrieved from the Internet , 2021, 4 pages.*

(Continued)

*Primary Examiner* — Muna A Techane
(74) *Attorney, Agent, or Firm* — FIG. 1 Patents

(57)                ABSTRACT
Multiple guard rows are included in a region of memory. Accesses to the region of memory are monitored and a revolver technique using the guard rows is enabled in response to the number of accesses to the region of memory equaling or exceeding a threshold amount within a given interval of time. The guard rows are moved around the region of memory with one or more non-guard rows being situated between the guard rows. A guard row refers to a row of the region of memory that stores invalid data, whereas the one or more non-guard rows store valid data. After being moved, accesses to the region of memory are monitored and after another threshold number of accesses to the region of memory the guard rows are moved again. This process continues with the guard rows being moved, e.g., in a circular manner, through the region of memory.

20 Claims, 10 Drawing Sheets

200

DRAM Region

Row 0

Row 1

Row 2

⋮

Row 511

First Guard Row — 202

Second Guard Row — 204

(56)         References Cited

OTHER PUBLICATIONS

Seshadri, Vivek, et al., "RowClone: fast and energy-efficient in-DRAM bulk data copy and initialization", MICRO-46: Proceedings of the 46th Annual IEEE/ACM International Symposium on Microarchitecture [retrieved Nov. 17, 2023]. Retrieved from the Internet , Dec. 2013, 13 pages.*

Kim, Yoongu , et al., "Flipping bits in memory without accessing them: an experimental study of DRAM disturbance errors", ACM SIGARCH Computer Architecture News, vol. 42, No. 3 [retrieved Sep. 15, 2022]. Retrieved from the Internet <https://people.cs.pitt.edu/~znati/Courses/cs2001/2001pprs/row-hammering.pdf>., Jun. 14, 2014, 12 Pages.

Liu, Jamie , et al., "RAIDR: Retention-Aware Intelligent DRAM Refresh", ACM SIGARCH Computer Architecture News, vol. 40, No. 3 [retrieved Nov. 30, 2023]. Retrieved from the Internet <https://doi.org/10.1145/2366231.2337161>, Jun. 2012, 12 pages.

Mutlu, Onur , et al., "RowHammer: A Retrospective", Cornell University, arXiv Preprint, arxiv.org [retrieved Nov. 30, 2023]. Retrieved from the Internet <https://arxiv.org/pdf/1904.09724.pdf>, Apr. 22, 2019, 16 pages.

Park, Yeonhong , et al., "Graphene: Strong yet Lightweight Row Hammer Protection", 2020 53rd Annual IEEE/ACM International Symposium on Microarchitecture (MICRO) [retrieved Dec. 14, 2023]. Retrieved from the Internet <https://doi.org/10.1109/MICRO50266.2020.00014>, Oct. 2020, 13 pages.

Qureshi, Moinuddin , "Rethinking ECC in the Era of Row-Hammer", DRAMSec [retrieved Nov. 30, 2023]. Retrieved from the Internet <https://dramsec.ethz.ch/papers/rethinking-ecc.pdf>, 2021, 4 pages.

Seshadri, Vivek , et al., "RowClone: fast and energy-efficient in-DRAM bulk data copy and initialization", MICRO-46: Proceedings of the 46th Annual IEEE/ACM International Symposium on Microarchitecture [retrieved Nov. 17, 2023]. Retrieved from the Internet <https://doi.org/10.1145/2540708.2540725>, Dec. 2013, 13 pages.

Seyedzadeh, Seyed Mohammad, et al., "Mitigating Wordline Cross-talk Using Adaptive Trees of Counters", ACM/IEEE 45th Annual International Symposium on Computer Architecture (ISCA) [retrieved Oct. 14, 2021]. Retrieved from the Internet <https://arxiv.org/pdf/1806.02498.pdf>., Jun. 2018, 12 Pages.

* cited by examiner

200

300

502

| | Physical Row | Logical Row |
|---|---|---|
| | 0x0 | 0x0 |
| | 0x1 | 0x1 |
| | 0x2 | 0x2 |
| | 0x3 | 0x3 |
| GUARD1 | 0x4 | |
| GUARD2 | 0x5 | |

504

| | Physical Row | Logical Row |
|---|---|---|
| | 0x0 | 0x0 |
| | 0x1 | 0x1 |
| | 0x2 | 0x2 |
| GUARD1 | 0x3 | |
| | 0x4 | 0x3 (PIVOT) |
| GUARD2 | 0x5 | |

506

| | Physical Row | Logical Row |
|---|---|---|
| | 0x0 | 0x0 |
| | 0x1 | 0x1 |
| GUARD1 | 0x2 | |
| | 0x3 | 0x2 (PIVOT) |
| GUARD2 | 0x4 | |
| | 0x5 | 0x3 |

508

| | Physical Row | Logical Row |
|---|---|---|
| | 0x0 | 0x0 |
| GUARD1 | 0x1 | |
| | 0x2 | 0x1 (PIVOT) |
| GUARD2 | 0x3 | |
| | 0x4 | 0x2 |
| | 0x5 | 0x3 |

Figure 5B:
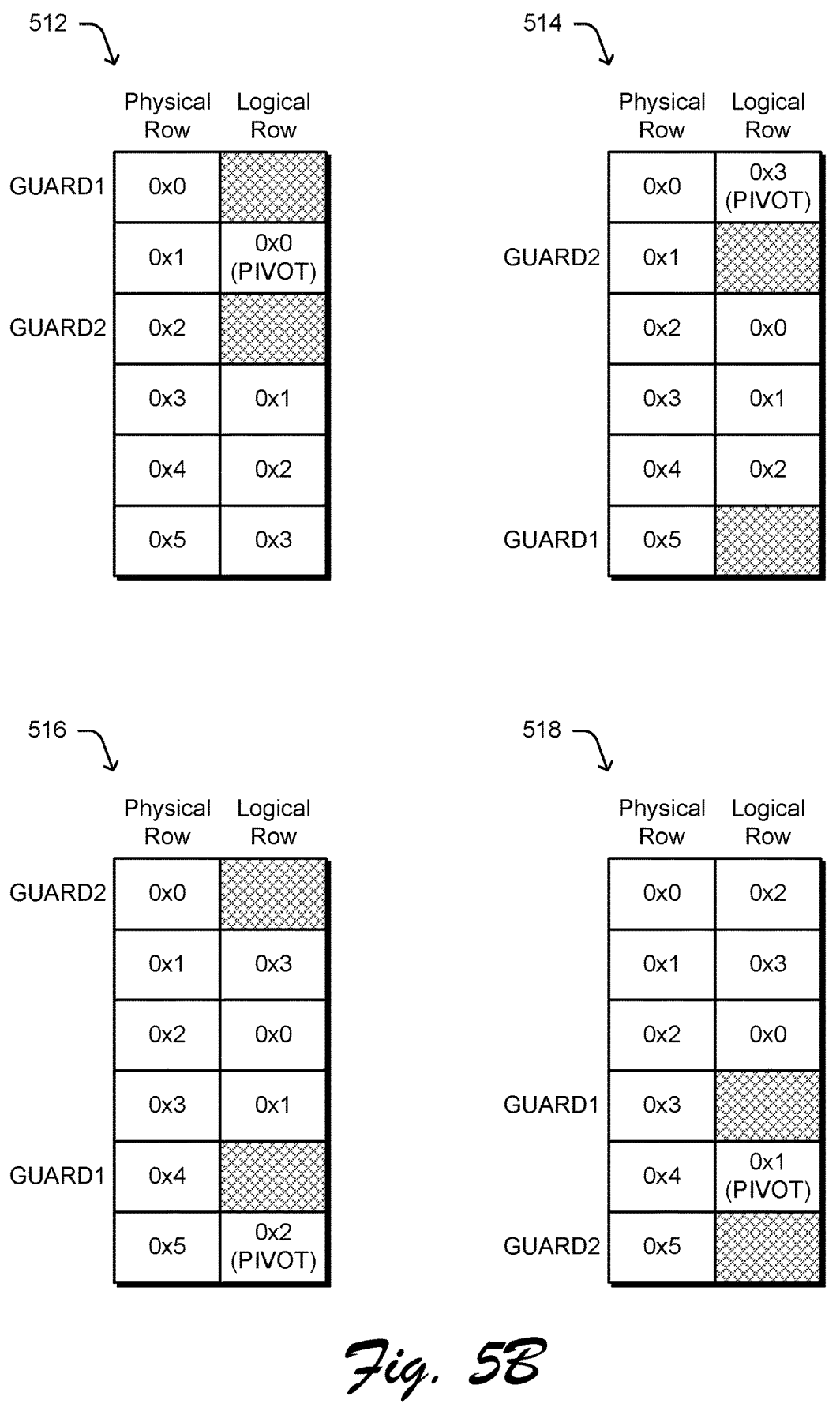

| | Physical Row | Logical Row |
|---|---|---|
| GUARD1 | 0x0 | |
| | 0x1 | 0x0 (PIVOT) |
| GUARD2 | 0x2 | |
| | 0x3 | 0x1 |
| | 0x4 | 0x2 |
| | 0x5 | 0x3 |

514

| | Physical Row | Logical Row |
|---|---|---|
| | 0x0 | 0x3 (PIVOT) |
| GUARD2 | 0x1 | |
| | 0x2 | 0x0 |
| | 0x3 | 0x1 |
| | 0x4 | 0x2 |
| GUARD1 | 0x5 | |

516

| | Physical Row | Logical Row |
|---|---|---|
| GUARD2 | 0x0 | |
| | 0x1 | 0x3 |
| | 0x2 | 0x0 |
| | 0x3 | 0x1 |
| GUARD1 | 0x4 | |
| | 0x5 | 0x2 (PIVOT) |

518

| | Physical Row | Logical Row |
|---|---|---|
| | 0x0 | 0x2 |
| | 0x1 | 0x3 |
| | 0x2 | 0x0 |
| GUARD1 | 0x3 | |
| | 0x4 | 0x1 (PIVOT) |
| GUARD2 | 0x5 | |

DRAM Region

| |
|---|
| Row 0 |
| Row 1 |
| Row 2 |
| ⋮ |
| First Guard Row |
| Second Guard Row |
| Row 511 |
| Third Guard Row |
| Fourth Guard Row |

— 602

— 604

— 606

— 608

700

DRAM Region

| |
|---|
| Row 0 |
| Row 1 |
| Row 2 |
| ⋮ |
| First Guard Row |
| Row 510 |
| Row 511 |
| Second Guard Row |

702

704

DRAM Region

| Row 0 |
| Row 1 |
| Row 2 |
| ⋮ |
| First Guard Row — 802 |
| Row 250 |
| Second Guard Row — 804 |
| ⋮ |
| Third Guard Row — 806 |
| Row 511 |
| Fourth Guard Row — 808 |

900

Monitor accesses to a region of memory
902

Move multiple guard rows through the region of
memory in response to a number of accesses to the
region of memory satisfying a first threshold, a pivot
row being located between the multiple guard rows
904

GUARD ROWS TO PROTECT REGIONS OF MEMORY

BACKGROUND

Computer technology is regularly advancing, resulting in faster computers. One such area of advancement is memory where the number of memory cells in a given die area is increasing. This increase is a result of various factors, such as reducing the size of memory cells or reducing the proximity of memory cells.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 5A and 5B illustrate an example of moving the guard rows.

DETAILED DESCRIPTION

Overview

Figure 1:
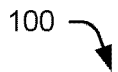
FIG. 1 is an illustration of a non-limiting example system that is operable to employ the techniques described herein.
Figure 1:
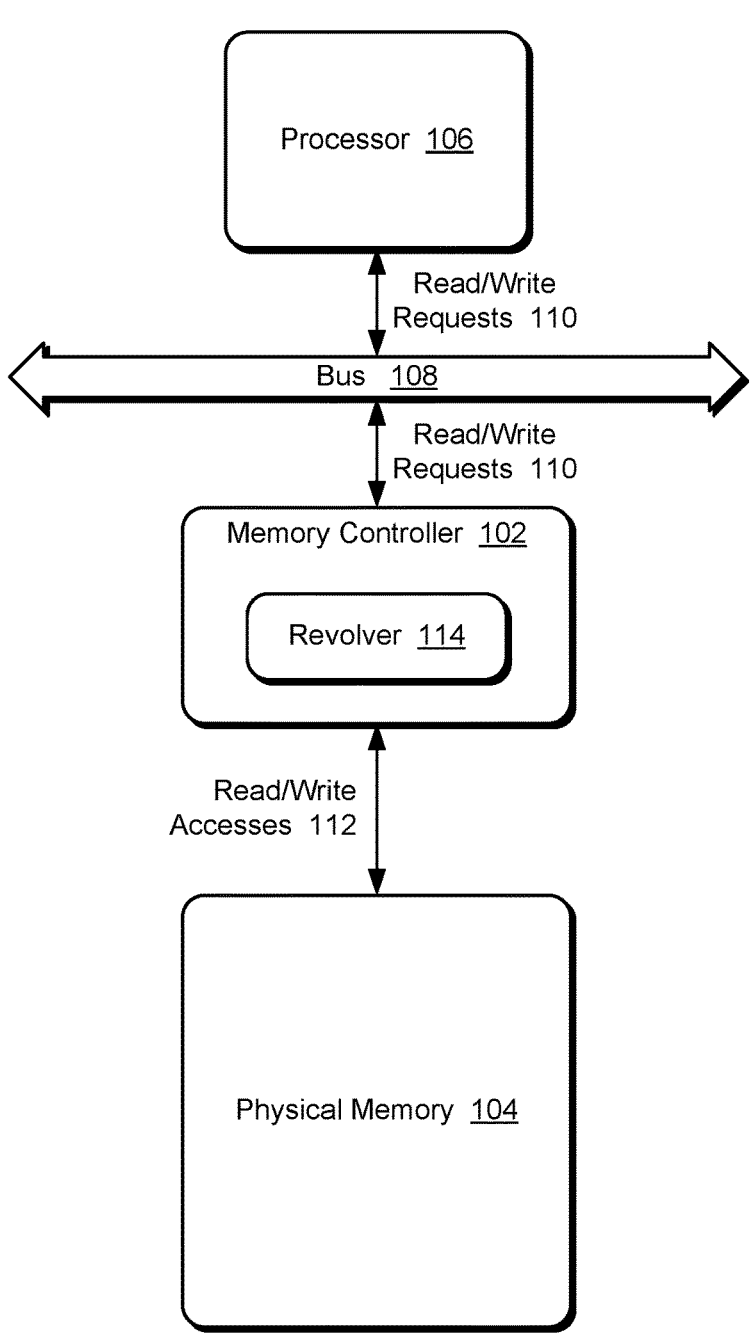

Computers use various types of memory, such as volatile memory (e.g., dynamic random access memory (DRAM)). The demand for high memory capacity is increasing, resulting in designers scaling down memory technology by reducing the proximity and size of cells and packing more cells in the same die area.

One problem experienced with memory is that different factors influence the reliability of the memory. For example, for DRAM, as memory is scaled down (e.g., below the 22 nanometer size), electromagnetic coupling (crosstalk) increases and results in frequent accesses to one part of memory creating disturbance errors in other parts of memory. This crosstalk is exploitable by malicious users or programs that attempt to alter values in one part of memory (e.g., one or more rows referred to as victim rows) by repeatedly accessing the another part of memory (e.g., a row referred to as the aggressor row), an attack referred to as row hammering.

The techniques discussed herein protect a region of memory that includes multiple rows, each row including multiple bits. An example region of memory is a subarray that includes 512 rows of 4096 DRAM cells per row.

Multiple (e.g., two) guard rows are added to the region of memory (e.g., so the 512 rows is expanded to be 514 rows). These guard rows are also referred to as auxiliary rows. Accesses to the region of memory are monitored and a revolver technique using the guard rows is enabled in response to the number of accesses to the region of memory satisfying (e.g., equaling or exceeding) a threshold amount within a given interval of time (also referred to as an epoch).

Using the revolver technique, the guard rows are moved around the region of memory with one or more regular (non-guard) rows being situated between the guard rows. A guard row refers to a row of the region of memory that does not store valid data (e.g., stores invalid data), whereas the one or more regular (non-guard) rows situated between the guard rows do store valid data. Valid data refers to information stored in the region of memory that is used or usable by software (e.g., an application or program), firmware, or hardware, such as data written to the memory by an application or program. Invalid data refers to data that is not used or usable by software, firmware, or hardware, such as bit values that have not been written to the memory by an application or program, or random bit values that the memory has prior to being written to. After being moved, accesses to the region of memory are monitored and after another threshold number of accesses to the region of memory the guard rows are moved again. This process continues with the guard rows being moved, e.g., in a circular manner, through the region of memory. By moving the guard rows through the region of memory, different rows of the region of memory are situated between the guard rows at different times. Accordingly, a row is protected against row hammer attacks over time due to the placement of guard rows on either side of the row.

In some examples, the techniques described herein relate to a system including: a physical memory; and a memory controller configured to monitor accesses to a region of the physical memory, and move multiple guard rows through the region of memory in response to a number of accesses to the region of memory satisfying a first threshold, a pivot row being located between the multiple guard rows, the pivot row storing valid data and each of the multiple guard rows storing invalid data.

In some examples, the techniques described herein relate to a system, wherein the memory controller is configured to: receive a system physical address corresponding to an access to the region of memory; generate a logical row address from the system physical address; map the logical row address to a physical row address; and perform the access to the region of memory using the physical row address.

In some examples, the techniques described herein relate to a system, wherein each of the accesses includes activation of a row of the region of memory.

In some examples, the techniques described herein relate to a system, wherein the region of memory includes a subarray.

In some examples, the techniques described herein relate to a system, wherein the multiple guard rows include a first guard row in a first row adjacent to the pivot row.

In some examples, the techniques described herein relate to a system, wherein the multiple guard rows include a second guard row in a second row adjacent to the pivot row.

In some examples, the techniques described herein relate to a system, wherein the memory controller is configured to repeatedly move, after the number of accesses to the region of memory since the multiple guard rows were previously moved satisfies a second threshold, the multiple guard rows.

In some examples, the techniques described herein relate to a system, wherein the memory controller is configured to not move the guard rows in response to all of the accesses to the region of memory since the multiple guard rows were previously moved being to the pivot row.

In some examples, the techniques described herein relate to a memory controller configured to monitor accesses to a region of physical memory and enable guard row movement in response to a number of accesses to the region of memory satisfying a first threshold, and, in response to guard row movement being enabled, move multiple guard rows through the region of memory, a pivot row being located between the multiple guard rows, the pivot row storing valid data and each of the multiple guard rows storing invalid data.

In some examples, the techniques described herein relate to a memory controller, wherein the region of memory includes a subarray, each of the accesses includes activation of a row of the subarray, and the multiple guard rows include a first guard row in a first row adjacent to the pivot row and a second guard row in a second row adjacent to the pivot row.

In some examples, the techniques described herein relate to a memory controller, wherein the memory controller is configured to repeatedly move, after the number of accesses to the region of memory since the multiple guard rows were previously moved satisfies a second threshold, the multiple guard rows.

In some examples, the techniques described herein relate to a memory controller, wherein the memory controller is configured to not move the guard rows in response to all of the accesses to the region of memory since the multiple guard rows were previously moved being to the pivot row.

In some examples, the techniques described herein relate to a method including: monitoring accesses to a region of memory; and moving multiple guard rows through the region of memory in response to a number of accesses to the region of memory satisfying a first threshold, a pivot row being located between the multiple guard rows, the pivot row storing valid data and each of the multiple guard rows storing invalid data.

In some examples, the techniques described herein relate to a method, further including: receiving a system physical address corresponding to an access to the region of memory; generating a logical row address from the system physical address; mapping the logical row address to a physical row address; and performing the access to the region of memory using the physical row address.

In some examples, the techniques described herein relate to a method, wherein each of the accesses includes activation of a row of the region of memory.

In some examples, the techniques described herein relate to a method, wherein the region of memory includes a subarray.

In some examples, the techniques described herein relate to a method, wherein the multiple guard rows include a first guard row in a first row adjacent to the pivot row.

In some examples, the techniques described herein relate to a method, wherein the multiple guard rows include a second guard row in a second row adjacent to the pivot row.

In some examples, the techniques described herein relate to a method, further including repeatedly moving, after the number of accesses to the region of memory since the multiple guard rows were previously moved satisfies a second threshold, the multiple guard rows.

In some examples, the techniques described herein relate to a method, further including not moving the guard rows in response to all of the accesses to the region of memory since the multiple guard rows were previously moved being to the pivot row.

FIG. 1 is an illustration of a non-limiting example system 100 that is operable to employ the techniques described herein. The system 100 includes a memory controller 102, a physical memory 104, and a processor 106 coupled to the memory controller 102 via a bus 108. The physical memory 104 is any of a variety of types of memory, such as volatile memory (e.g., DRAM). The processor 106 is any of a variety of processors, controllers, co-processors (e.g., a graphics processing unit (GPU), a parallel accelerated processor), and so forth. The processor 106 optionally includes a single core or multiple cores. Although a system with a single processor 106 is illustrated, it is to be appreciated that the system 100 optionally includes two or more processors of the same or different types capable of issuing read and write requests 110. The bus 108 is any of a variety of communication systems that transfer one or both of data or commands between components in the system 100. The bus 108 is, for example, a system bus.

The memory controller 102 manages reading data from and writing data to the physical memory 104, for example receiving read and write requests 110 from the processor 106 via the bus 108, performing the corresponding read or write access 112 to the physical memory 104, and returning any appropriate data (e.g., the requested data for a write access). The memory controller 102 receives the read and write requests 110 from any of various sources, such as a cache controller of the processor 106, the operating system running at least in part on the processor 106, and so forth. The physical memory 104 includes one or more regions of physical memory. In one or more implementations, each region of physical memory includes multiple rows, each row including multiple bits. An example region of physical memory is a subarray or tile of physical memory (e.g., multiple rows in a bank of physical memory, such as DRAM).

The memory controller 102 includes a revolver 114 that, when enabled, moves guard rows around a region of the physical memory 104 with one or more regular (non-guard) rows being situated between the guard rows. By moving the guard rows through the region of memory, different rows of the region of memory are situated between the guard rows at different times, protecting rows of the region of the physical memory 104. The revolver 114 is implementable in any of hardware, software, firmware, or a combination thereof, including a processor, a controller, a co-processor (e.g., a graphics processing unit (GPU), a parallel accelerated processor), and so forth running software or firmware to implement the techniques discussed herein. The revolver 114, when not enabled, need not (e.g., does not) move guard rows around the region of the physical memory 104 with one or more regular (non-guard) rows being situated between the guard rows.

The system 100 is implementable in any of a variety of different types of computing devices that include or use physical memory 104. For example, the system 100 is implementable in a smartphone or other wireless phone, a tablet or phablet computer, a notebook computer (e.g., netbook or ultrabook), a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television), an Internet of Things (IoT) device, an automotive computer, and so forth.

Figure 2:
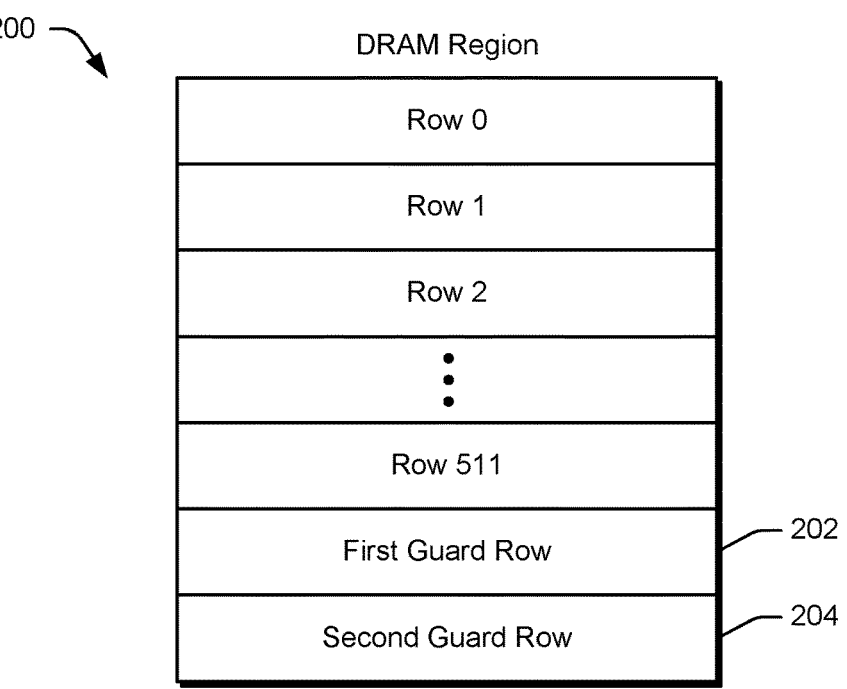
FIG. 2 illustrates an example of a region of memory including multiple guard rows.

FIG. 2 illustrates an example of a region of memory 200 including multiple guard rows. The example region of memory 200 illustrates a region of DRAM, such as a subarray, including 514 rows, shown as row 0, row 1, row 2, . . . , row 511. The example region of memory 200 also shows a guard row 202 and a guard row 204. The example of FIG. 2 illustrates the DRAM region when the revolver 114 is not enabled. When the revolver 114 is not enabled, the guard rows need not have any regular (non-guard) rows situated between them. In the illustrated example of FIG. 2, the multiple guard rows are adjacent guard rows at the end of the region of memory 200 (e.g., after row 511). Additionally, one or more of the multiple guard rows are situated elsewhere in the region of memory 200.

Figure 3:
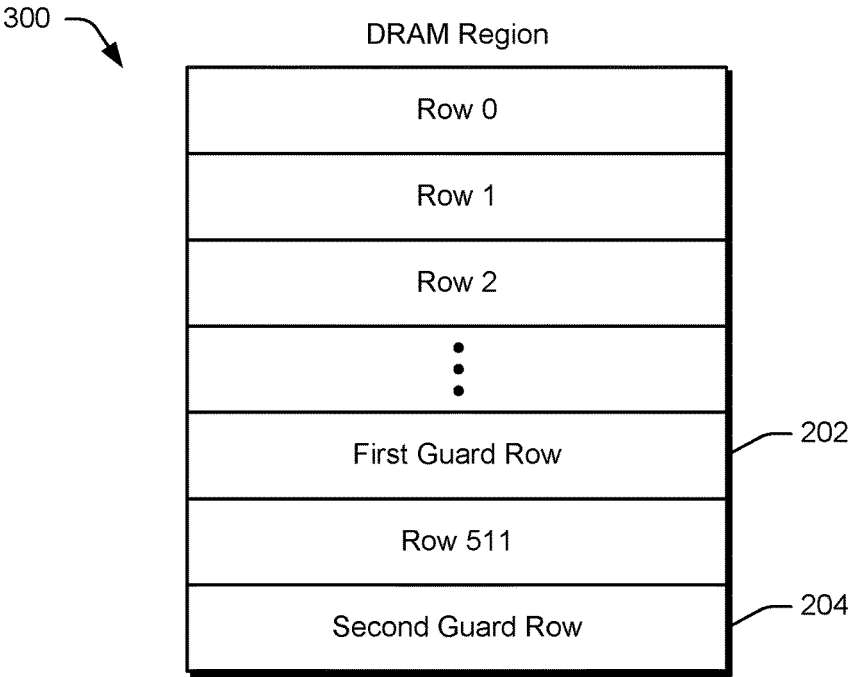
FIG. 3 illustrates another example of a region of memory including multiple guard rows.

FIG. 3 illustrates an example of a region of memory 300 including multiple guard rows. The example region of memory 300 illustrates a region of DRAM, such as a subarray, including 514 rows, shown as row 0, row 1, row 2, . . . , row 511. The example region of memory 300 also shows a guard row 202 and a guard row 204. The example of FIG. 3 illustrates the DRAM region when the revolver 114 is enabled. When the revolver 114 is enabled, the guard rows 202 and 204 are on either side of a regular (non-guard) row, illustrated as row 511. The guard rows 202 and 204 are shifted or moved around the region of memory 300 as discussed in more detail below.

Having at least one guard row between a regular (non-guard) row and other rows in the region of memory 300 protects the region of memory 300 from attacks such as a row hammer attack. This protection is provided because if the regular (non-guard) row were to be repeatedly accessed (e.g., written to or read from) numerous times, the adjacent rows that could be altered are the guard rows. Since the guard rows do not store valid data, even if the values in the guard rows were altered by the repeated access to the regular (non-guard) row, no valid data in the region of memory 300 is being altered.

Figure 4:
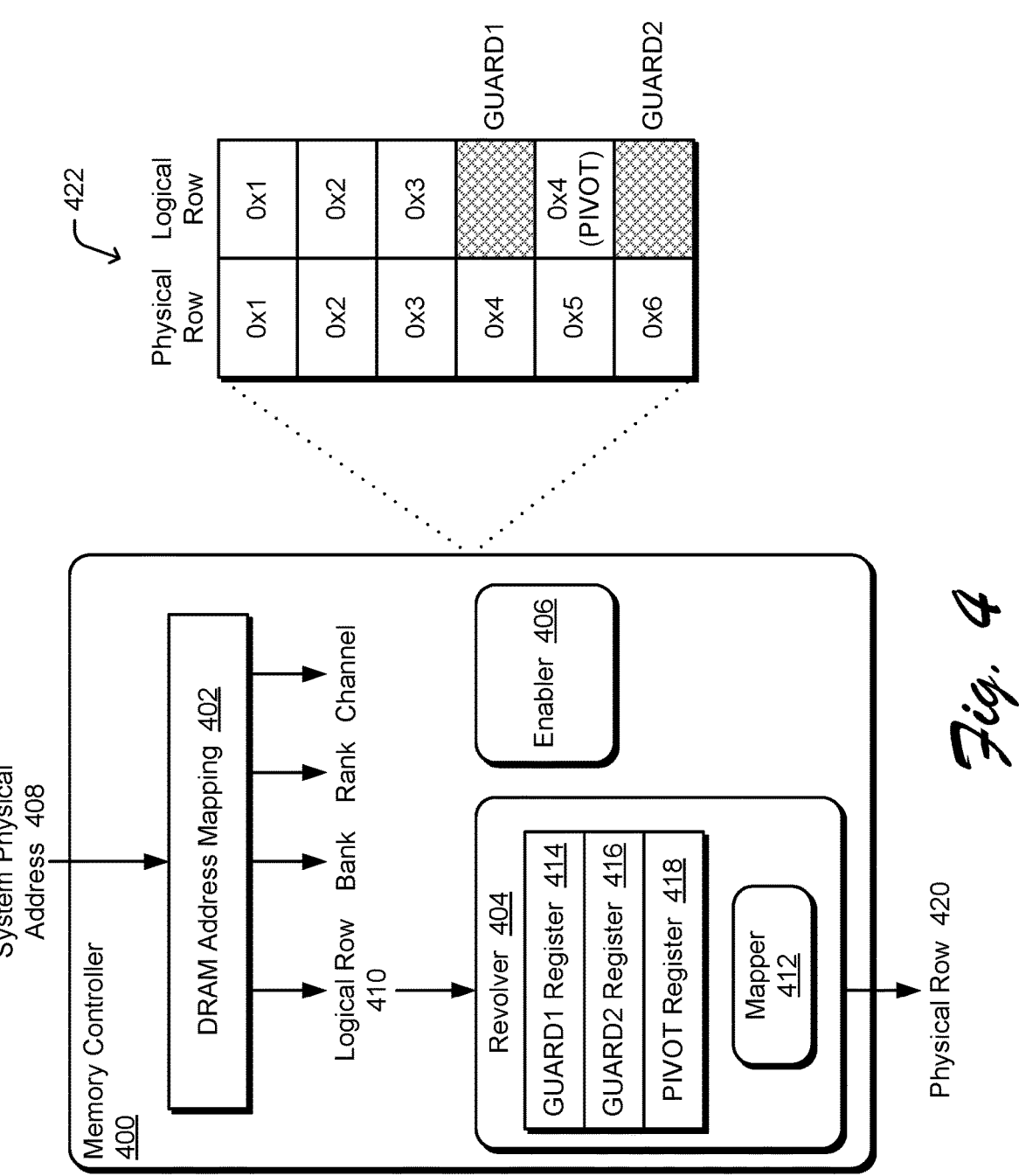
FIG. 4 illustrates an example of a memory controller implementing the techniques discussed herein.

FIG. 4 illustrates an example of a memory controller 400 implementing the techniques discussed herein. The memory controller 400 includes DRAM address mapping 402, revolver 404, and enabler 406. The memory controller 400 is an example of the memory controller 102 of FIG. 1 and the revolver 404 is an example of the revolver 114 of FIG. 1. The memory controller 400 is implementable in any of hardware, software, firmware, or a combination thereof, including a processor, a controller, a co-processor, and so forth running software or firmware to implement the techniques discussed herein.

In one or more implementations the revolver 404 and the enabler 406 are each implemented in hardware circuitry. In one or more implementations, the hardware circuitry includes a Field Programmable Gate Array (FPGA), a complex programmable logic device (CPLD), an Application Specific Integrated Circuit (ASIC) or other integrated circuit (IC), and so forth. Additionally or alternatively, the hardware circuitry includes a processor or controller programmable to perform an algorithm (e.g., perform one or more operations by executing software or firmware instructions). In one or more implementations, the hardware circuitry implementing the revolver 404 and the hardware circuitry implementing the enabler 406 is the same hardware circuitry (e.g., the same FPGA, CPLD, ASIC, IC, processor, or controller). Additionally or alternatively, the hardware circuitry implementing the revolver 404 and the hardware circuitry implementing the enabler 406 are different hardware circuitry (e.g., different FPGAs, CPLDs, ASICs, ICs, processors, or controllers) or different portions of the same hardware circuitry (e.g., different portions of the same FPGA, CPLD, ASIC, IC, processor, or controller).

The revolver 404 allows one or more regions of physical memory (e.g., physical memory 104 of FIG. 1) to be protected against row hammering by using guard rows. In one or more implementations, all physical memory is protected (e.g., all DRAM). Additionally or alternatively, the revolver 404 protects only certain portions of DRAM, such as portions of DRAM storing a reverse map table (RMP), portions of DRAM storing firmware pages, and so forth.

The DRAM address mapping 402 receives a system physical address 408, such as an address associated with a read or write access 112 of FIG. 1. The DRAM address mapping 402 generates and outputs a logical row 410, bank, rank, and channel to allow the appropriate location in physical memory (e.g., the physical memory 104 of FIG. 1) to be accessed. The DRAM address mapping 402 is typically hardware circuitry but is implementable in any of hardware, software, firmware, or a combination thereof.

The enabler 406 determines when to enable or disable the revolver 404. This determination is made, for example, based on accesses to the physical memory as discussed in more detail below.

The revolver 404 includes a mapper 412, a guard register 414, a guard register 416, and a pivot register 418. When enabled, the revolver 404 maps the logical row 410 received from the DRAM address mapping 402 to a physical row 420 in the physical memory. This mapping will vary based on the positions of the guard rows as discussed in more detail below. When the revolver 404 is not enabled, the logical row 410 and the physical row 420 are the same. Accordingly, in one or more implementations the revolver 404 outputs the logical row 410 as the physical row 420. Additionally or alternatively, the revolver 404 is bypassed and the memory controller 400 outputs the logical row 410 as the physical row 420.

An example mapping 422 of logical rows to physical rows used by the memory controller 400 is shown. The example mapping 422 illustrates six physical rows, shown as 0x1, 0x2, 0x3, 0x4, 0x5, and 0x6, and four rows logical rows shown as 0x1, 0x2, 0x3, and 0x4. Logical row 0x1 is mapped to physical row 0x1, logical row 0x2 is mapped to physical row 0x2, logical row 0x3 is mapped to physical row 0x3, and logical row 0x4 is mapped to physical row 0x5. The example mapping 422 shows physical rows 0x4 and 0x6 as guard rows. The physical rows with valid data are also referred to as regular (or non-guard) rows. The physical rows that do not have valid data are also referred to as guard rows.

The revolver 404 uses three registers (guard register 414, guard register 416, and pivot register 418) per region of memory to track guard rows and compute logical row to physical row mappings. Accordingly, if there are multiple regions of memory (e.g., multiple subarrays), the revolver 404 uses three such registers for each different region of memory. The guard register 414 and the guard register 416 point to physical rows, e.g., storing identifiers of the physical locations (e.g., physical row addresses) of the guard rows. The pivot register 418 points to a logical row, e.g., storing an identifier of the logical row (e.g., a logical row address) that is located between the guard rows, also referred to as a pivot row. In the example of FIG. 4, guard register 414 points to 0x4, the guard register 416 points to 0x6, and the pivot register 418 points to 0x4.

Following the example of FIG. 4, if the logical row 410 is 0x1 then mapper 412 maps the logical row 0x1 to physical row 0x1 and revolver 404 outputs 0x1 as the physical row

420. If the logical row 410 is 0x2 then mapper 412 maps the logical row 0x2 to physical row 0x2 and revolver 404 outputs 0x2 as the physical row 420. If the logical row 410 is 0x3 then mapper 412 maps the logical row 0x3 to physical row 0x3 and revolver 404 outputs 0x3 as the physical row 420. If the logical row 410 is 0x4 then mapper 412 maps the logical row 0x4 to physical row 0x5 and revolver 404 outputs 0x5 as the physical row 420.

By moving the guard rows over time, different physical rows will be guard rows at different times. FIGS. 5A and 5B illustrate an example of moving the guard rows. In one or more implementations, moving the guard rows is also referred to as revolving the guard rows.

Mapping 502 illustrates a starting location for the guard rows at the end of the region of memory. Mapping 502 is also optionally used when the revolver 404 is disabled. As shown in mapping 502, each logical row is directly mapped to the same physical row (e.g., logical row 0x0 is mapped to physical row 0x0, logical row 0x1 is mapped to physical row 0x1, etc.).

When the revolver 404 is enabled, the first guard row is shifted by one position as shown in mapping 504. This is accomplished by: (i) copying valid data from physical row 0x3 into physical row 0x4; (ii) updating guard register 414 to point to physical row 0x3; and (iii) setting the pivot register 418 to point to logical row 0x3. Afterwards, whenever the revolver 404 is triggered for this region of memory, the guard rows are moved with both guard rows being shifted by one step to the adjacent physical rows and the pivot register 418 being shifted by one step to the adjacent logical row. For example, mapping 506 shows the movement of the guard rows after the mapping 504. Guard register 414 points to physical row address 0x2, guard register 416 points to physical row address 0x4, and the pivot register 418 points to logical row address 0x2. This is accomplished by: (i) copying the data of the adjacent row (physical row 0x2) of the physical row pointed to by the guard register 414 into the physical row pointed to by the guard register 414; (ii) updating guard register 414 to point to physical row 0x2; (iii) decrementing the pivot register 418 by 1 (e.g., to 0x2); (iv) copying the data of the adjacent row (physical row 0x4) of the physical row pointed to by the guard register 416 into the physical row of the pointed to by the guard register 416; and (iv) updating the guard register 416 to point to physical row 0x4.

By way of another example, mapping 508 shows the movement of the guard rows after the mapping 506. The guard register 414 points to physical row address 0x1, the guard register 416 points to physical row address 0x3, and the pivot register 418 points to logical row address 0x1.

By way of another example, mapping 512 shows the movement of the guard rows after the mapping 508. The guard register 414 points to physical row address 0x0, the guard register 416 points to physical row address 0x2, and the pivot register 418 points to logical row address 0x0.

In one or more implementations, the revolver 404 moves the guard rows in a circular manner, wrapping from the beginning of the region of memory (e.g., row 0x0) to the ending of the region of memory (e.g., row 0x5). For example, mapping 512 shows the movement of the guard rows after the mapping 512. The guard register 414 points to physical row address 0x5, the guard register 416 points to physical row address 0x1, and the pivot register 418 points to logical row address 0x3.

By way of another example, mapping 516 shows the movement of the guard rows after the mapping 512. The guard register 414 points to physical row address 0x4, the guard register 416 points to physical row address 0x0, and the pivot register 418 points to logical row address 0x2.

By way of another example, mapping 518 shows the movement of the guard rows after the mapping 516. The guard register 414 points to physical row address 0x3, the guard register 416 points to physical row address 0x5, and the pivot register 418 points to logical row address 0x1.

In one or more implementations, the movement of the guard rows and the pivot row is expressed as follows, where GUARD1 refers to the value in the guard register 414, GUARD2 refers to the value in the guard register 416, PIVOT refers to the value in the pivot register 418, M refers to the total number of logical rows (4 in the examples of FIGS. 5A and 5B), N refers to the total number of physical rows (6 in the example of FIGS. 5A and 5B-4 logical rows plus 2 guard rows), LR refers to logical row, PR refers to physical row, % refers to the modulo operation, and square brackets [ ] refer to the value at that address (e.g., [GUARD1] refers to the data at the location specified by GUARD1, and [GUARD2] refers to the data at the location specified by GUARD2). Each time the guard rows are to be moved, the following actions are performed:

1: Copy next row's data into the row pointed to by GUARD1 ([GUARD1]=[(GUARD1+N−1) % N])·
2: Move GUARD1 by 1 in PR space (GUARD1= (GUARD1+N−1) %
3: Move PIVOT by 1 in LR space (PIVOT=(PIVOT+M− 1) % M)
4: Copy next row's data into the row pointed to by GUARD2 ([GUARD2]=[(GUARD2+N−1) % N])
5: Move GUARD2 by 1 in PR space (GUARD2= [(GUARD2+N−1) % N])

Actions 2, 3, and 5 (moving GUARD1, PIVOT, and GUARD2) are register updates performed within the memory controller 400, resulting in very little overhead. Actions 1 and 4 (copying data) are memory (e.g., DRAM) operations that incur power and memory bandwidth. In one or more implementations, actions 1 and 4 are performed using a technique that copies DRAM rows without moving data out of DRAM, such as RowClone. This reduces latency and energy usage of a row, thereby reducing power and performance overhead (e.g., reduces latency and energy usage of a 4 kilobyte row copy by factors of approximately 11 and 74 for some DRAM technologies).

In one or more implementations using RowClone, to copy data from a source row (src) to a destination row (dst) within the same subarray, the source row is activated. At the end of the activation, the sense amplifiers and the bitlines are in a stable state corresponding to the data of the source row. The cells of the source row are fully restored to their original state. In this state, simply lowering the wordline of src and raising the wordline corresponding to dst connects the cells of the destination row with the stable bitlines. Doing so overwrites the data on the cells of the destination row with the data on the bitlines.

Additionally or alternatively, using RowClone, to copy data from a source row in one bank to a destination row in a different bank, the corresponding rows in both banks are activated. The source bank is put in the read mode, the destination bank is put in the write mode, and data is transferred one cache line (e.g., corresponding to a column of data, such as 64 bytes) at a time. For this purpose, in one example a DRAM command called TRANSFER is used. The TRANSFER command takes four parameters: 1) source bank index, 2) source column index, 3) destination bank index, and 4) destination column index. The TRANSFER command copies the cache line corresponding to the source column index in the activated row of the source bank to the cache line corresponding to the destination column index in the activated row of the destination bank. Unlike READ/ WRITE commands, which interact with the memory channel connecting the processor and main memory, the TRANSFER command does not transfer data outside the chip.

Additionally or alternatively, on a DRAM read or write request, the mapper 412 algorithmically maps the logical row (also referred to as LR) to the physical row (also referred to as PR) as follows:

If LR<PIVOT, then PR=(GUARD1−(PIVOT−LR)+N) % N

If LR=PIVOT, then PR=(GUARD1+1+N) % N

If LR>PIVOT, then PR=(GUARD2+(LR−PIVOT)) % N

It should be noted that logical row to physical row mapping does not incur latency overhead due to mapper 412 performing simple addition and modulus operations.

The enabler 406 determines when to enable or disable the revolver 404 based on a number of row activations (e.g., resulting from read or write requests) of the region of memory. Activation of a row refers to opening the row and moving the charge from the capacitors in the row to the sense amplifiers for the memory. In one or more implementations, the enabler 406 enables the revolver 404 in response to at least a threshold number of row activations of the region of memory within a particular time period also referred to as an epoch. This epoch is, for example, the refresh period for the region of memory. The threshold number of row activations (also referred to as row hammer threshold or TRH) is based on, for example, a smallest number of row activations per epoch that is expected to be needed to induce bit flips in adjacent rows of memory. The row hammer threshold is typically less than (e.g., approximately 10% of) the smallest number of row activations per epoch that is expected to be needed to induce bit flips in adjacent rows of memory. For example, the smallest number of row activations per epoch that is expected to be needed to induce bit flips in adjacent rows of double data rate 4 (DDR4) DRAM is 10,000, in which case the row hammer threshold is 1,000.

The row hammer threshold is set in any of a variety of different manners. In one or more implementations, the enabler 406 is preconfigured with the value of the row hammer threshold, such as by a designer or manufacturer of the memory controller 400. Additionally or alternatively, the enabler 406 is configured with the value of the row hammer threshold during startup or booting of a computing device that includes the memory controller 400.

The enabler 406 maintains a counter that is reset each epoch. In one or more implementations, a different counter is used for each region of memory allowing revolver 404 to be enabled or disabled on a per region of memory basis. Once enabled, if the number of row activations falls below a second threshold, the enabler 406 disables the revolver 404. In response to being disabled, the revolver 404 returns the guard rows to their starting location (e.g., as illustrated in mapping 502). In one or more implementations, this second threshold is the row hammer threshold. Additionally or alternatively, the second threshold is different than the row hammer threshold.

In one or more implementations, when enabled the revolver 404 moves the guard rows (e.g., shifts the guard rows one step (e.g., by one row)) after a third threshold number of row activations (also referred to as a shift threshold). In one or more implementations, the value of this shift threshold is less than the row hammer threshold, such as approximately 1% of the row hammer threshold. After moving the guard rows, the revolver 404 starts counting the number of row activations from zero again (e.g., resets a counter to zero) and then moves the guard rows again after the shift threshold number of row activations.

In one or more implementations if all of the shift threshold number of row activations are to the row located between the multiple guard rows (e.g., if LR XOR PIVOT=0 for each of the shift threshold number of row activations), then revolver 404 does not move the guard rows. The revolver 404 does not move the guard rows in this situation because if there is only one aggressor row in a subarray and that row is already enclosed between the guard rows, then the adjacent victim rows are already protected, and further movement of guard rows is unnecessary, thereby reducing power or performance overheads.

The shift threshold is set in any of a variety of different manners. In one or more implementations, the enabler 406 is preconfigured with the value of the shift threshold, such as by a designer or manufacturer of the memory controller 400. Additionally or alternatively, the enabler 406 is configured with the value of the shift threshold during startup or booting of a computing device that includes the memory controller 400.

The revolver 404 ensures that if one or more aggressor rows exist in a region of memory, then their adjacent victim rows are periodically refreshed (preventing bit-flips) due to the movement (e.g., circular rotation) of the guard rows. As an example, if the region of memory is a subarray of DDR4 memory, the row hammer threshold is set to 1,000 activations per epoch (10 times lower than the smallest number of row activations per epoch that is expected to be needed to induce bit flips in adjacent rows of DDR4 (e.g., approximately 10,000 activations)). If the row hammer threshold is reached for a subarray, the revolver 404 is enabled for the subarray. The shift threshold is set to 10 activations to shift the guard rows, e.g., after every 10 activations to a subarray the guard rows are shifted by 1 position. If there are 512 rows in a subarray (plus 2 guard rows), after 5120 activations (512 rows×10 activations per shift operation) all the rows in the subarray are shifted and refreshed once. Consequently, the aggressor row would never reach the row hammer threshold of 10,000 activations without the adjacent victim rows getting refreshed due to the movement of the guard rows. Furthermore, the circular rotation ensures that aggressor rows get remapped to new physical locations within the subarray, preventing prolonged victimization of any one portion of the subarray.

In the discussions herein, reference is made to two guard rows with a pivot row located between the two guard rows. However, in one or more implementations there are one or both of more than two guard rows per region of memory or more than two pivot rows per memory region.

Figure 6:
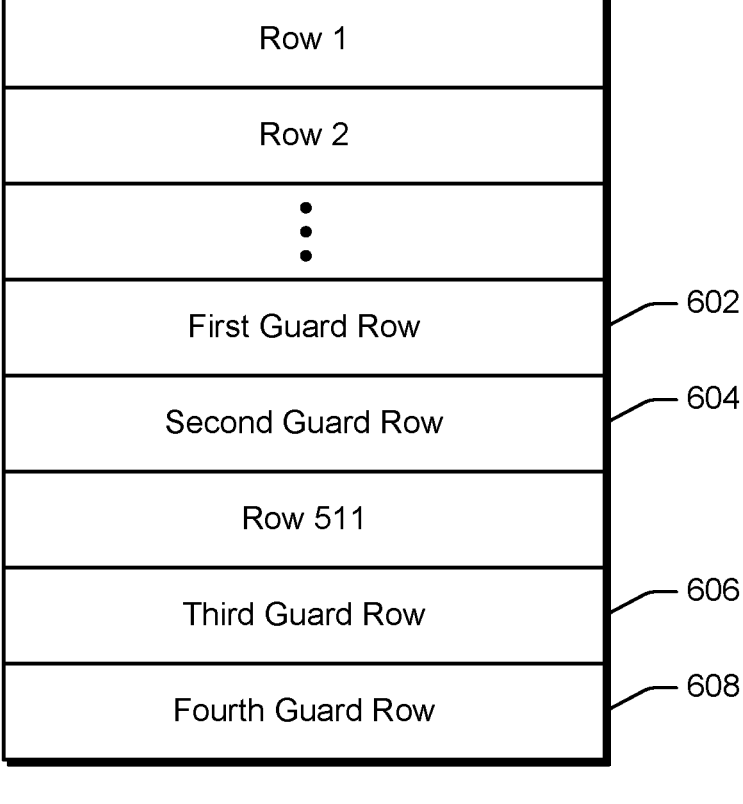
FIG. 6 illustrates another example of a region of memory including multiple guard rows.

FIG. 6 illustrates an example of a region of memory 600 including multiple guard rows. The example region of memory 600 illustrates a region of DRAM, such as a subarray, including 514 rows, shown as row 0, row 1, row 2, . . . , row 511. The example region of memory 600 also includes four guard rows, shown as guard row 602, guard row 604, guard row 606, and guard row 608. The example of FIG. 6 illustrates the DRAM region when the revolver 404 is enabled. When the revolver 404 is enabled, the guard rows 602 and 604 are on one side of a regular (non-guard) row, illustrated as row 511, and the guard rows 606 and 608 are on the other side of the regular (non-guard) row. The guard rows 602, 604, 606, and 608 are shifted or moved around the region of memory 600 analogous to the discussion above, except that the guard rows 602 and 604 are moved as a pair (e.g., analogous to GUARD1 discussed above) and the guard rows 606 and 608 are shifted or moved around the region of memory as a pair (e.g., analogous to GUARD2 discussed above).

Figure 7:
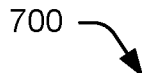
FIG. 7 illustrates another example of a region of memory including multiple guard rows.
Figure 7:
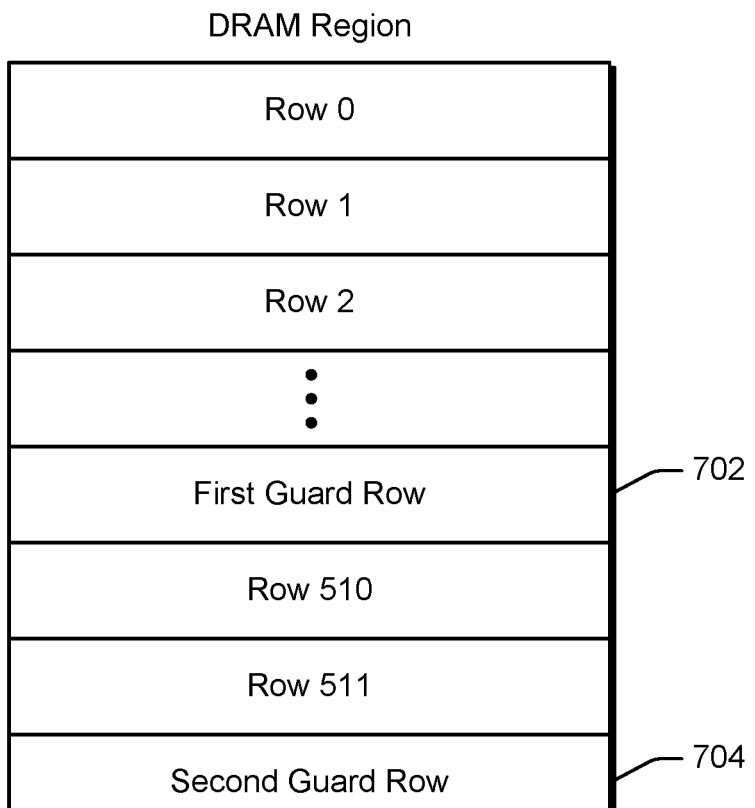

FIG. 7 illustrates an example of a region of memory 700 including multiple guard rows. The example region of memory 700 illustrates a region of DRAM, such as a subarray, including 514 rows, shown as row 0, row 1, row 2, . . . , row 511. The example region of memory 700 also includes two guard rows, shown as guard row 702 and guard row 704. The example of FIG. 7 illustrates the DRAM region when the revolver 404 is enabled. When the revolver 114 is enabled, the guard rows 702 and 704 are on either side of two regular (non-guard) rows, illustrated as rows 510 and 511. The guard rows 702 and 704 are shifted or moved around the region of memory 700 analogous to the discussion above, except that the rows 510 and 511 are moved as a pair (e.g., analogous to PIVOT discussed above).

Figure 8:
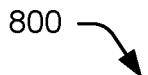
FIG. 8 illustrates another example of a region of memory including multiple guard rows.
Figure 8:
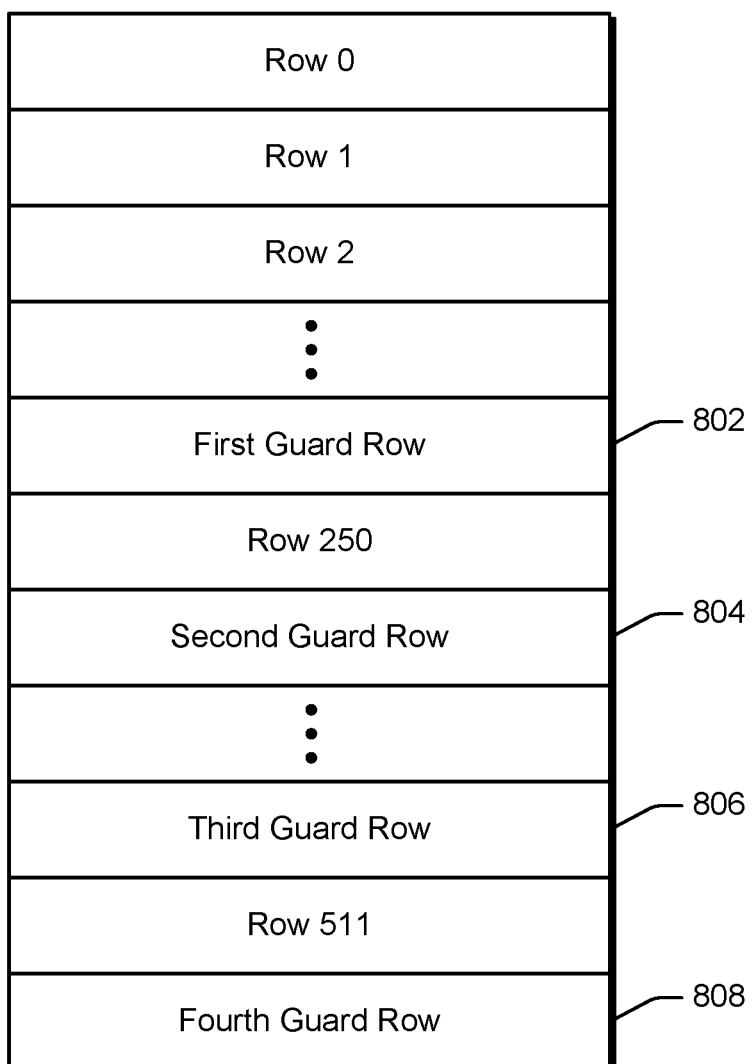

FIG. 8 illustrates an example of a region of memory 800 including multiple guard rows. The example region of memory 800 illustrates a region of DRAM, such as a subarray, including 514 rows, shown as row 0, row 1, row 2, . . . , row 511. The example region of memory 800 also includes four guard rows, shown as guard row 802, guard row 804, guard row 806, and guard row 808. The example of FIG. 8 illustrates the DRAM region when the revolver 404 is enabled. When the revolver 114 is enabled, the guard rows 802 and 804 are on either side a regular (non-guard) rows, illustrated as row 250, and the guard rows 806 and 808 are on either side of another regular (non-guard) row, illustrated as row 511. The guard rows 802 and 804 are shifted or moved around the region of memory 800 analogous to the discussion above, and the guard rows 806 and 808 are shifted or moved around the region of memory 800 analogous to the discussion above. The guard rows 802, 804, 806, and 808 allow two different pivot rows to be located between two different sets of guard rows at a time.

Referring back to FIG. 4, in one or more implementations the revolver 404 need not include all three of the guard register 414, the guard register 416, and the pivot register 418. In such situations, the revolver 404 determines the value that would be stored in any one of the registers 414, 416, and 418 based on one or more or more the other of the registers 414, 416, and 418. In one example, the revolver 404 includes the pivot register 418 but does not include the guard register 414 or the guard register 416. The value that would be stored in the guard register 414 is readily calculated, such as GUARD1=(PIVOT+N−1) % N where GUARD1 refers to the value that would be stored in the guard register 414, PIVOT refers to the value in the pivot register 418, N refers to the total number of physical rows, and % refers to the modulo operation. Similarly, the value that would be stored in the guard register 416 is readily calculated, such as GUARD2=(PIVOT+N+1) % N, where GUARD2 refers to the value that would be stored in the guard register 416, PIVOT refers to the value in the pivot register 418, N refers to the total number of physical rows, and % refers to the modulo operation.

In the discussions above, reference is made to the guard rows being moved by 1 in a circular pattern backwards (from physical row 0x3 towards physical row 0x0). Additionally or alternatively, the guard rows are moved in other manners or patterns. In one example, the guard rows are moved by 2 or more rather than 1. In another example, the guard rows are moved by 1 or more in a circular pattern forwards (from physical row 0x0 towards physical row 0x3). In another example, the guard rows are moved in a non-circular manner according to any of various rules or criteria.

In the discussion above, when the revolver 404 is disabled the guard rows are illustrated as being the last two rows in the region of memory (e.g., as illustrated in mapping 502 of FIG. 5A). This simplifies operation of the revolver 404 because each logical row is directly mapped to the same physical row when the revolver 404 is disabled. Additionally or alternatively, the guards are situated elsewhere in the region of memory (e.g., at the beginning of the region of memory).

Using the techniques discussed herein, since the revolver 404 is enabled only when the activations per epoch are greater than the row hammer threshold, the revolver 404 does not incur any power or performance overheads for non-row-hammer memory access patterns, e.g., when total activations in a subarray are less than the row hammer threshold.

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. Furthermore, although various operations performed by one or more devices are recited, the techniques discussed herein additionally or alternatively include additional operations. In portions of the following discussion, reference is made to FIGS. 1-8.

Figure 9:
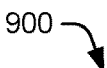
FIG. 9 is a flow diagram depicting a procedure in an example implementation of guard rows to protect regions of memory.

FIG. 9 is a flow diagram 900 depicting a procedure in an example implementation of guard rows to protect regions of memory. The flow diagram 900 illustrates an algorithm that is performed by a memory controller such as memory controller 102 of FIG. 1 or memory controller 400 of FIG. 4.

In this example, accesses to a region of memory are monitored (block 902). The region of memory is, for example, a subarray of DRAM.

Multiple guard rows are moved through the region of memory in response to a number of accesses to the region of memory satisfying a first threshold (block 904). A pivot row is located between the multiple guard rows, the pivot row storing valid data and each of the multiple guard rows storing invalid data. The guard rows are moved, for example, in steps of 1 row at a time in a circular manner.

Figure 10:
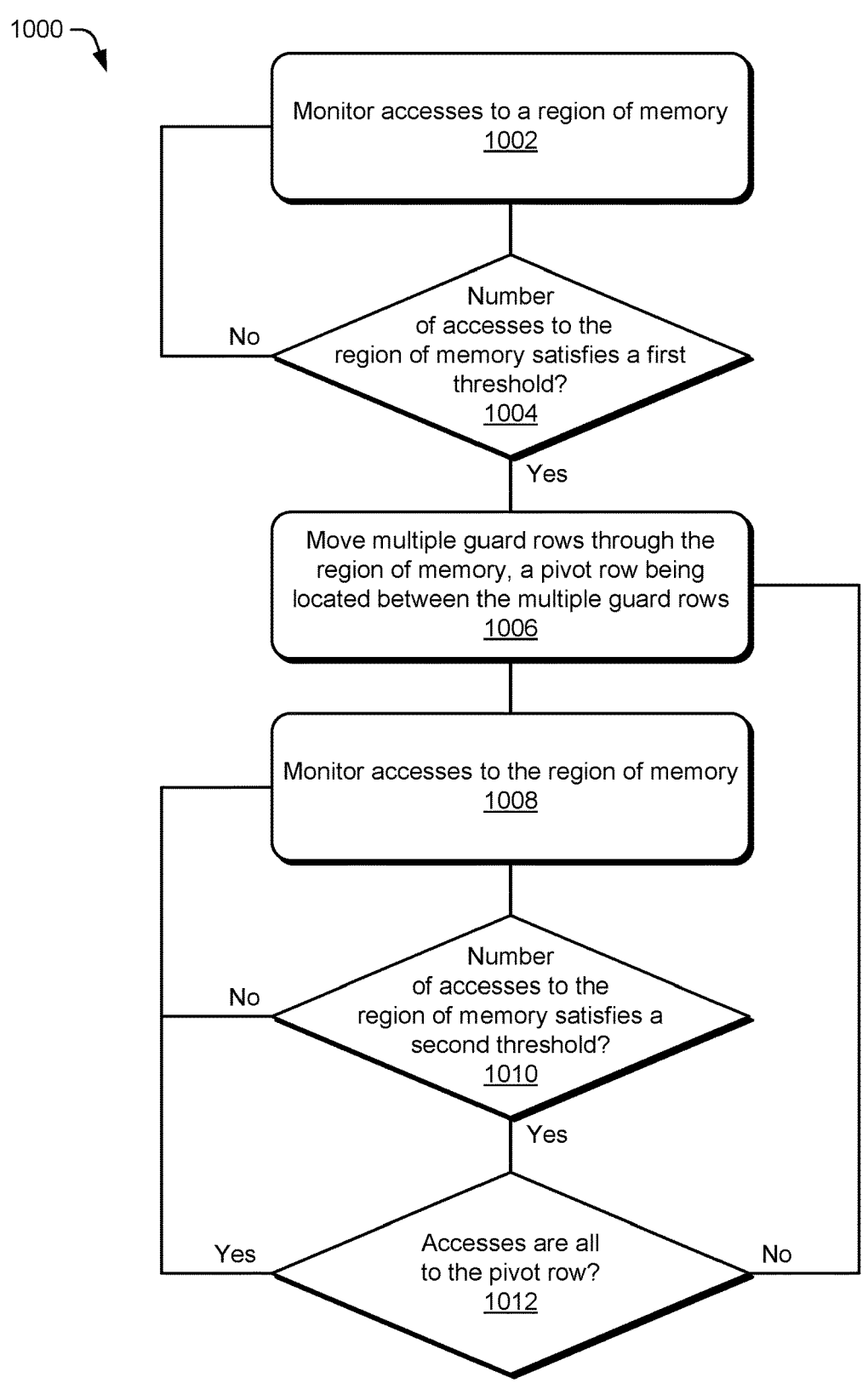
FIG. 10 is another flow diagram depicting a procedure in an example implementation of guard rows to protect regions of memory.

FIG. 10 is a flow diagram 1000 depicting a procedure in an example implementation of guard rows to protect regions of memory. The flow diagram 1000 illustrates an algorithm that is performed by a memory controller such as memory controller 102 of FIG. 1 or memory controller 400 of FIG. 4.

In this example, accesses to a region of memory are monitored (block 1002). The region of memory is, for example, a subarray of DRAM.

A check is made as to whether the number of accesses to the region of memory satisfies (e.g., equals or exceeds) a first threshold (block 1004). This first threshold is, for example, a row hammer threshold discussed above.

If the number of accesses to the region of memory does not satisfy the first threshold, accesses to the region of memory continue to be monitored (block 1002).

If the number of accesses to the region of memory does satisfy the first threshold, multiple guard rows are moved through the region of memory (block 1006). A pivot row is located between the multiple guard rows, the pivot row storing valid data and each of the multiple guard rows storing invalid data. The guard rows are moved, for example, in steps of 1 row at a time in a circular manner.

Accesses to the region of memory continue to be monitored (block 1008).

A check is made as to whether the number of accesses monitored in block 1008 satisfies (e.g., equals or exceeds) a second threshold (block 1010). This second threshold is, for example, a shift threshold discussed above.

If the number of accesses monitored in block 1008 does not satisfy the second threshold, accesses to the region of memory continue to be monitored (block 1008).

If the number of accesses monitored in block 1008 does satisfy the second threshold, a check is made as to whether all of the accesses monitored in block 1008 are accesses to the pivot row (block 1012).

If all of the accesses monitored in block 1008 are not accesses to the pivot row, multiple guard rows are moved through the region of memory (block 1006).

If all of the accesses monitored in block 1008 are accesses to the pivot row, accesses to the region of memory continue to be monitored (block 1008). The number of accesses is reset without moving the multiple guard rows.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the memory controller 102, the revolver 114, the memory controller 400, the revolver 404, and the enabler 406) are implemented in any of a variety of different manners such as hardware circuitry, software executing or firmware executing on a programmable processor, a controller, a co-processor (e.g., a GPU, a parallel accelerated processor), and so forth, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a GPU, a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
a physical memory; and
a memory controller configured to:
   monitor accesses to a region of the physical memory; and
   move multiple guard rows through the region of memory in response to a number of accesses to the region satisfying a first threshold, wherein a pivot row is located between at least a first guard row of the multiple guard rows and a second guard row of the multiple guard rows, and wherein the pivot row stores valid data and each of the multiple guard rows stores invalid data.

2. The system of claim 1, wherein the memory controller is configured to:
receive a system physical address corresponding to an access to the region;
generate a logical row address from the system physical address;
map the logical row address to a physical row address; and
perform the access to the region using the physical row address.

3. The system of claim 1, wherein each of the accesses comprises activation of a row of the region.

4. The system of claim 1, wherein the region comprises a subarray.

5. The system of claim 1, wherein the first guard row is in a first row adjacent to the pivot row.

6. The system of claim 5, wherein the second guard row is in a second row adjacent to the pivot row.

7. The system of claim 1, wherein the memory controller is configured to repeatedly move, after the number of accesses to the region since the multiple guard rows were previously moved satisfies a second threshold, the multiple guard rows.

8. The system of claim 7, wherein the memory controller is configured to not move the multiple guard rows in response to all of the accesses to the region since the multiple guard rows were previously moved being to the pivot row.

9. A memory controller configured to:
monitor accesses to a region of physical memory and enable guard row movement in response to a number of accesses to the region satisfying a first threshold; and
in response to the guard row movement being enabled, move multiple guard rows through the region, wherein a pivot row is located between at least a first guard row of the multiple guard rows and a second guard row of the multiple guard rows, and wherein the pivot row stores valid data and each of the multiple guard rows stores invalid data.

10. The memory controller of claim 9, wherein the region comprises a subarray, and each of the accesses comprises activation of a row of the subarray, and wherein the first guard row is in a first row adjacent to the pivot row and the second guard row is in a second row adjacent to the pivot row.

11. The memory controller of claim 9, wherein the memory controller is configured to repeatedly move, after the number of accesses to the region since the multiple guard rows were previously moved satisfies a second threshold, the multiple guard rows.

12. The memory controller of claim 11, wherein the memory controller is configured to not move the multiple guard rows in response to all of the accesses to the region since the multiple guard rows were previously moved being to the pivot row.

13. A method comprising:

monitoring accesses to a region; and moving multiple guard rows through the region in response to a number of accesses to the region satisfying a first threshold, wherein a pivot row is located between at least a first guard row of the multiple guard rows and a second guard row of the multiple guard rows, and wherein the pivot row stores valid data and each of the multiple guard rows stores invalid data.

14. The method of claim 13, further comprising:

receiving a system physical address corresponding to an access to the region of memory;

generating a logical row address from the system physical address;

mapping the logical row address to a physical row address; and performing the access to the region of memory using the physical row address.

15. The method of claim 13, wherein each of the accesses comprises activation of a row of the region of memory.

16. The method of claim 13, wherein the region of memory comprises a subarray.

17. The method of claim 13, wherein the first guard row is in a first row adjacent to the pivot row.

18. The method of claim 17, wherein the second guard row is in a second row adjacent to the pivot row.

19. The method of claim 13, further comprising repeatedly moving, after the number of accesses to the region of memory since the multiple guard rows were previously moved satisfies a second threshold, the multiple guard rows.

20. The method of claim 19, further comprising not moving the multiple guard rows in response to all of the accesses to the region of memory since the multiple guard rows were previously moved being to the pivot row.

* * * * *